(12) United States Patent
Zhou et al.

(10) Patent No.: US 12,187,266 B2
(45) Date of Patent: Jan. 7, 2025

(54) AUTONOMOUS DRIVING METHOD AND APPARATUS

(71) Applicant: Huawei Technologies Co., Ltd., Guangdong (CN)

(72) Inventors: Zheng Zhou, Beijing (CN); Mingchao Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 118 days.

(21) Appl. No.: 17/957,980

(22) Filed: Sep. 30, 2022

(65) Prior Publication Data

US 2023/0022123 A1 Jan. 26, 2023

Related U.S. Application Data

(63) Continuation of application No. PCT/CN2021/079573, filed on Mar. 8, 2021.

(51) Int. Cl.
*B60Q 1/48* (2006.01)
*B60W 30/06* (2006.01)
(Continued)

(52) U.S. Cl.
CPC ....... *B60W 30/06* (2013.01); *G08G 1/096725* (2013.01); *G08G 1/096783* (2013.01); *G08G 1/146* (2013.01); *B60W 2556/40* (2020.02)

(58) Field of Classification Search
CPC ............. B60W 30/06; B60W 2556/40; B60W 60/0015; B60W 40/06; B60W 50/14; B60W 60/0025; B60W 2050/0005; B60W 2050/146; B60W 2556/45; G08G 1/096725; G08G 1/096783; G08G 1/146; G08G 1/0112; G08G 1/096775; G08G 1/142; G08G 1/147; G08G 1/0967; G06Q 50/40;
(Continued)

(56) References Cited

U.S. PATENT DOCUMENTS 10,126,430 B2 * 11/2018 Matsumoto ........ G01C 21/3461
2013/0211656 A1 8/2013 An et al.
(Continued)

FOREIGN PATENT DOCUMENTS

CN 107207013 A 9/2017
CN 107430817 A 12/2017
(Continued)

*Primary Examiner* — Anh V La
(74) *Attorney, Agent, or Firm* — WOMBLE BOND DICKINSON (US) LLP

(57) ABSTRACT

An autonomous driving method, an autonomous driving apparatus, a computer-readable storage medium, and a computer program product are provided. The method includes: receiving first driving-related information of a first road section ahead of a road on which a first vehicle currently drives and information about a parking waiting area that are sent by a network side device, where the parking waiting area is used to park the first vehicle before the first vehicle drives into the first road section (S304); then determining, based on the first driving-related information, that the first road section does not meet an autonomous driving condition requirement of the first vehicle (S305); finally, controlling the first vehicle to drive into the parking waiting area (S306).

19 Claims, 10 Drawing Sheets

(51) Int. Cl.
*G08G 1/0967* (2006.01)
*G08G 1/14* (2006.01)

(58) Field of Classification Search
CPC .......... G06Q 10/06311; G01C 21/3438; G01C 21/3415; G01C 21/3492; G01C 21/3629; G01C 21/367; G01C 21/3815; G01C 21/3878; G01C 21/3885; G06F 9/06
USPC .............. 340/932.2, 988, 990, 995.1, 995.19
See application file for complete search history.

(56) References Cited

U.S. PATENT DOCUMENTS

| | | | |
|---|---|---|---|
| 2016/0305787 A1* | 10/2016 | Sato | G08G 1/096844 |
| 2017/0010613 A1* | 1/2017 | Fukumoto | G08G 1/096844 |
| 2018/0023966 A1 | 1/2018 | Iwai et al. | |
| 2018/0072315 A1 | 3/2018 | Enthaler et al. | |
| 2019/0162547 A1* | 5/2019 | Ootsuji | G09B 29/00 |
| 2021/0206367 A1 | 7/2021 | Liu et al. | |

FOREIGN PATENT DOCUMENTS

| | | |
|---|---|---|
| CN | 107499311 A | 12/2017 |
| CN | 107848538 A | 3/2018 |
| CN | 109448410 A | 3/2019 |
| CN | 109689466 A | 4/2019 |
| CN | 109808615 A | 5/2019 |
| CN | 110386148 A | 10/2019 |
| EP | 3264211 A1 | 1/2018 |
| JP | 2011118603 A | 6/2011 |
| JP | 2014106854 A | 6/2014 |
| JP | 2019045347 A | 3/2019 |
| JP | 2019125101 A | 7/2019 |
| JP | 2019185293 A | 10/2019 |

\* cited by examiner

AUTONOMOUS DRIVING METHOD AND APPARATUS

CROSS-REFERENCE TO RELATED APPLICATIONS

This application is a continuation of International Application No. PCT/CN2021/079573, filed on Mar. 8, 2021, which claims priority to Chinese Patent Application No. 202010251875.4, filed on Apr. 1, 2020. The disclosures of the aforementioned applications are hereby incorporated by reference in their entireties.

TECHNICAL FIELD

Embodiments of this application relate to the intelligent driving field, and in particular, to an autonomous driving method and apparatus.

BACKGROUND

Autonomous driving technologies are developing rapidly. Currently, driving automation (driving automation) levels of vehicles are classified into five levels, including no automation, driver assistance, partial automation, conditional automation, high automation, and full automation. A higher level of autonomous driving indicates a lower degree of driver participation.

At an existing technical level, autonomous driving has not reached a full automation phase. If a road condition does not meet an autonomous driving condition, the vehicle exits an autonomous driving program, and reminds, in various manners, a driver to take over the vehicle within a specified time, and the driver drives the vehicle. However, with development of autonomous driving, a requirement for the driver decreases accordingly, and a case in which a driver lacks experience and cannot take over an autonomous driving vehicle or there is even no driver may occur, which leads to a security risk of the vehicle when a road condition does not meet an autonomous driving condition.

SUMMARY

Embodiments of this application provide an autonomous driving method and apparatus, to resolve a problem in the conventional technology that there is a safety risk of a vehicle when a road condition does not meet an autonomous driving condition.

According to a first aspect, embodiments of this application provide an autonomous driving method. The method may be applied to an autonomous driving apparatus. The autonomous driving apparatus may be a vehicle, a vehicle-mounted device, or a chip in a vehicle-mounted device. The vehicle-mounted device may be a head unit or a device located on a vehicle. The following uses a vehicle-mounted terminal as an example for description. In the method, the vehicle-mounted terminal receives first driving-related information of a first road section ahead of a road on which a first vehicle currently drives and information about a parking waiting area that are sent by a network side device, where the parking waiting area is used to park the first vehicle before the first vehicle drives into the first road section. Then, vehicle-mounted terminal determines, based on the first driving-related information, that the first road section does not meet an autonomous driving condition requirement of the first vehicle. Finally, the vehicle-mounted terminal controls the first vehicle to drive into the parking waiting area. The first driving-related information includes but is not limited to a road condition restriction, definition of road markings and lines, a road administration level, a road technology level, a population density, a traffic volume, a weather condition, or a road emergency. The network side device includes but is not limited to a server, a base station, or a road side unit.

According to the autonomous driving method provided in the first aspect, when the first road section ahead of the road on which the first vehicle currently drives is not suitable for autonomous driving, the vehicle may automatically drive into the parking waiting area, to implement safe parking, thereby reducing a safety risk.

In one embodiment, the information about the parking waiting area is included in dynamic layer information of a map.

In one embodiment, before the vehicle-mounted terminal receives the first driving-related information of the first road section ahead of the road on which the first vehicle currently drives and the information about the parking waiting area that are sent by the network side device, the method further includes: sending second driving-related information of the first vehicle to the network side device. The second driving-related information includes but is not limited to an autonomous driving condition requirement the vehicle, an autonomous driving status, a current location, a planned driving route, or road condition information collected by the vehicle.

In one embodiment, before the vehicle-mounted terminal controls the first vehicle to drive into the parking waiting area, the method further includes: determining that no qualified driver takes over the first vehicle.

In this embodiment, before the vehicle-mounted terminal controls the first vehicle to drive into the parking waiting area, it may be determined that no qualified driver takes over the first vehicle, to ensure safety of the vehicle when the vehicle is unmanned or the driver cannot drive.

In one embodiment, after the vehicle-mounted terminal controls the first vehicle to drive into the parking waiting area, the method further includes: The vehicle-mounted terminal receives third driving-related information of the first road section that is sent by the network side device, where the third driving-related information is an update of the first driving-related information. The vehicle-mounted terminal determines, based on the third driving-related information, that the first road section meets the autonomous driving condition requirement of the first vehicle. The vehicle-mounted terminal controls the first vehicle to drive through the first road section in an autonomous driving mode. It should be noted that the network side device that sends the third driving related information and the network side device that sends the first driving related information may be a same device, or may be different devices.

In this embodiment, after controlling the first vehicle to drive into the parking waiting area, the vehicle-mounted terminal may monitor in real time whether the first road section meets the autonomous driving condition requirement of the first vehicle. After the first road section meets the autonomous driving condition requirement of the first vehicle, the vehicle-mounted terminal may control the first vehicle to drive through the first road section in an autonomous driving mode in time, so that the vehicle can continue a trip in time after the road ahead recovers.

In one embodiment, after the vehicle-mounted terminal controls the first vehicle to drive into the parking waiting area, the method further includes outputting request information to a user of the first vehicle, where the request information is used to request the user to indicate any one of the following content: whether the vehicle can drive out of the first road section through remote driving, whether the vehicle can drive out of the first road section through guidance based on a route and a time planned by a server, or whether the vehicle can follow another vehicle to drive out of the first road section.

In this embodiment, after the vehicle-mounted terminal controls the first vehicle to drive into the parking waiting area, the vehicle-mounted terminal may request for instructions from the user, to drive out of the first road section in different manners.

In one embodiment, the information about the parking waiting area may include: a lane number of the parking waiting area, a start location of the parking waiting area, a location of each parking space in the parking waiting area, or an occupation status of the parking space.

According to a second aspect, embodiments of this application provide an autonomous driving method. The method may be applied to an autonomous driving apparatus. The autonomous driving apparatus may be a network device, for example, a server or a road side unit. Alternatively, the autonomous driving apparatus may be an apparatus in a server or an apparatus in a road side unit. For example, the autonomous driving apparatus may be a chip in a server or a chip in a road side unit. The following uses a server as an example for description. In the method, the server receives first driving-related information of a first road section from at least one vehicle or a network side device. Then, the server sends the first driving-related information and information about a parking waiting area to a first vehicle, where a first road section is located ahead of a road on which the first vehicle currently drives, and the parking waiting area is used to park the first vehicle before the first vehicle drives into the first road section.

In one embodiment, the information about the parking waiting area is included in dynamic layer information of a map.

In one embodiment, before the server sends the first driving-related information and the information about the parking waiting area to the first vehicle, the method further includes:

The server receives second driving-related information of the first vehicle from the first vehicle.

The server determines the parking waiting area based on the second driving-related information and the first driving-related information.

In one embodiment, after the server sends the first driving-related information and the information about the parking waiting area to the first vehicle, the method further includes:

The server sends third driving-related information to the first vehicle, where the third driving-related information is an update of the first driving-related information.

In one embodiment, the information about the parking waiting area may include: a lane number of the parking waiting area, a start location of the parking waiting area, a location of each parking space in the parking waiting area, or an occupation status of the parking space.

According to a third aspect, embodiments of this application provide an autonomous driving apparatus, including a receiving module, a processing module, and a control module.

The receiving module is configured to receive first driving-related information of a first road section ahead of a road on which a first vehicle currently drives and information about a parking waiting area that are sent by a network side device, where the parking waiting area is used to park the first vehicle before the first vehicle drives into the first road section.

The processing module is configured to determine, based on the first driving-related information, that the first road section does not meet an autonomous driving condition requirement of the first vehicle.

The control module is configured to control the first vehicle to drive into the parking waiting area.

The autonomous driving apparatus may be, for example, a vehicle, or may be a vehicle-mounted apparatus, a component, or a chip in a vehicle. The vehicle-mounted apparatus includes a mobile terminal disposed in the vehicle.

In one embodiment, the information about the parking waiting area is included in dynamic layer information of a map.

In one embodiment, the apparatus further includes a sending module, configured to: before the receiving module receives the first driving-related information of the first road section ahead of the road on which the first vehicle currently drives and the information about the parking waiting area that are sent by the network side device, send second driving-related information of the first vehicle to the network side device.

In one embodiment, the processing module is further configured to: before the control module controls the first vehicle to drive into the parking waiting area, determine that no qualified driver takes over the first vehicle.

In one embodiment, the receiving module is further configured to: after the control module controls the first vehicle to drive into the parking waiting area, receive third driving-related information of the first road section that is sent by the network side device, where the third driving-related information is an update of the first driving-related information, and determine, based on the third driving-related information, that the first road section meets the autonomous driving condition requirement of the first vehicle; and the control module is further configured to control the first vehicle to drive through the first road section in an autonomous driving mode.

In one embodiment, the apparatus further includes an output module, configured to: after the control module controls the first vehicle to drive into the parking waiting area, output request information to a user of the first vehicle, where the request information is used to request the user to indicate any one of the following content: whether the vehicle can drive out of the first road section through remote driving, whether the vehicle can drive out of the first road section through guidance based on a route and a time planned by a server, or whether the vehicle can follow another vehicle to drive out of the first road section.

In one embodiment, the information about the parking waiting area may include: a lane number of the parking waiting area, a start location of the parking waiting area, a location of each parking space in the parking waiting area, or an occupation status of the parking space.

According to a fourth aspect, embodiments of this application provide an autonomous driving apparatus, including a receiving module and a sending module.

The receiving module is configured to receive first driving-related information of a first road section from at least one vehicle or a network side device.

The sending module is configured to send the first driving-related information and information about a parking waiting area to a first vehicle, where the first road section is located ahead of a road on which the first vehicle currently drives, and the parking waiting area is used to park the first vehicle before the first vehicle drives into the first road section.

The autonomous driving apparatus is, for example, a server, a base station, or a road side unit, or may be a component or a chip inside these devices.

In one embodiment, the information about the parking waiting area is included in dynamic layer information of a map.

In one embodiment, the receiving module is further configured to: before the sending module sends the first driving-related information and the information about the parking waiting area to the first vehicle, receive second driving-related information of the first vehicle from the first vehicle; and the apparatus further includes a processing module, configured to determine the parking waiting area based on the second driving-related information and the first driving-related information.

In one embodiment, the sending module is further configured to send third driving-related information to the first vehicle, where the third driving-related information is an update of the first driving-related information.

In one embodiment, the information about the parking waiting area may include: a lane number of the parking waiting area, a start location of the parking waiting area, a location of each parking space in the parking waiting area, or an occupation status of the parking space.

According to a fifth aspect, embodiments of this application provide an autonomous driving apparatus, including a memory and a processor.

The memory stores computer program instructions, and the processor runs the computer program instructions to perform the autonomous driving method according to the first aspect and the embodiments of the first aspect. The autonomous driving apparatus may be, for example, a vehicle, or may be a vehicle-mounted apparatus, a component, or a chip in a vehicle. The vehicle-mounted apparatus includes a mobile terminal disposed in the vehicle.

According to a sixth aspect, embodiments of this application provide an autonomous driving apparatus, including a memory and a processor.

The memory stores computer program instructions, and the processor runs the computer program instructions to perform the autonomous driving method according to the second aspect and the embodiments of the second aspect. The autonomous driving apparatus is, for example, a server, a base station, or a road side unit, or may be a component or a chip inside these devices.

According to a seventh aspect, a computer program product is provided. When being executed by a processor, the computer program product is used to perform the method in the first aspect.

According to an eighth aspect, a computer program product is provided. When being executed by a processor, the computer program product is used to perform the method in the second aspect.

According to a ninth aspect, a program product is provided, for example, a computer-readable storage medium, including the program in the seventh aspect.

According to a tenth aspect, a program product is provided, for example, a computer-readable storage medium, including the program in the eighth aspect.

According to an eleventh aspect, an embodiment of this application provides a chip, including: a memory and a processor. The memory is configured to store program instructions. The processor is configured to invoke the program instructions in the memory to perform the method according to the first aspect.

According to a twelfth aspect, an embodiment of this application provides a chip, including a memory and a processor. The memory is configured to store program instructions, and the processor is configured to invoke the program instructions in the memory to perform the communication method according to the second aspect.

According to a thirteenth aspect, a computer-readable storage medium is provided. The computer-readable storage medium stores instructions, and when the instructions are run on a computer, the computer performs the method according to the first aspect.

According to a fourteenth aspect, a computer-readable storage medium is provided. The computer-readable storage medium stores instructions, and when the instructions are run on a computer, the computer performs the method according to the second aspect.

According to the autonomous driving method and apparatus provided in embodiments of this application, first driving-related information of a first road section ahead of a road on which a first vehicle currently drives and information about a parking waiting area that are sent by a network side device are received, where the parking waiting area is used to park the first vehicle before the first vehicle drives into the first road section. Then, it is determined, based on the first driving-related information, that the first road section does not meet an autonomous driving condition requirement of the first vehicle. Finally, the first vehicle is controlled to drive into the parking waiting area. In this manner, when the first road section ahead of the road on which the first vehicle currently drives does not meet the autonomous driving condition requirement, the vehicle may automatically drive into the parking waiting area, to implement safe parking, thereby reducing a safety risk.

DESCRIPTION OF EMBODIMENTS

Embodiments of this application provide an autonomous driving method and apparatus, to resolve a problem in the conventional technology that there is a safety risk of a vehicle when a road condition does not meet an autonomous driving condition. In this application, when the road section ahead of a road on which the vehicle currently drives does not meet an autonomous driving condition requirement, the vehicle is controlled to drive into a parking waiting area, thereby improving driving safety, and reducing the safety risk of the vehicle when the road condition does not meet an autonomous driving condition.

Figure 1:
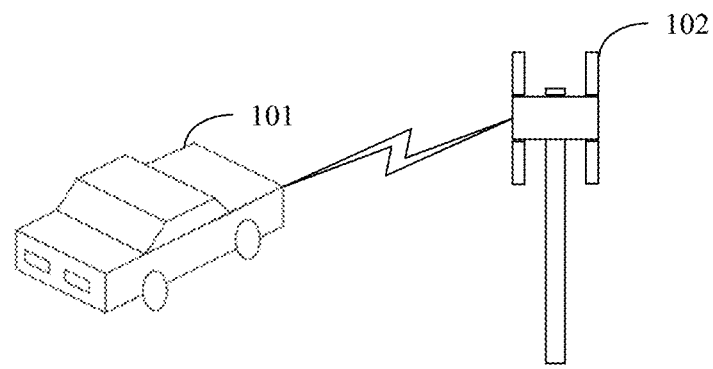
FIG. 1 is a schematic diagram of an autonomous driving application scenario according to an embodiment of this application.

The following first describes an application scenario in embodiments of this application. This application is applicable to an autonomous driving scenario. FIG. 1 is a schematic diagram of an autonomous driving application scenario according to an embodiment of this application. As shown in FIG. 1, a vehicle 101 and a road side unit (road side unit, RSU) 102 are included. The vehicle 101 may drive on a road. The road side unit 102 is disposed on two sides of the road. The vehicle 101 interacts with the road side unit 102. The road side unit 102 collects driving-related information and sends indication information to the vehicle 101. The vehicle 101 receives the indication information from the road side server 102, and automatically drives.

Figure 2:
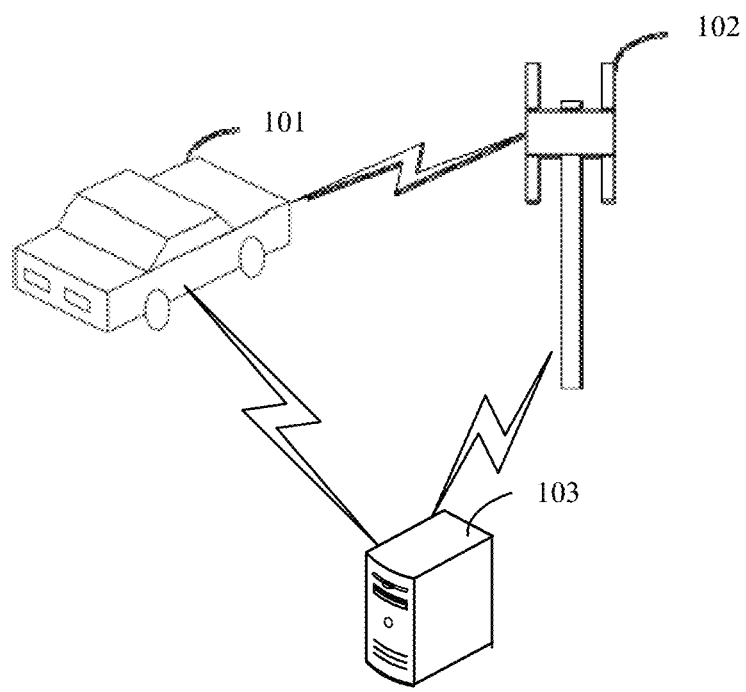
FIG. 2 is a schematic diagram of another autonomous driving application scenario according to an embodiment of this application.

FIG. 2 is a schematic diagram of another autonomous driving application scenario according to an embodiment of this application. As shown in FIG. 2, a vehicle 101, an RSU 102, and a server 103 are included. The vehicle 101 interacts with the road side unit 102, and the server 103 interacts with the vehicle 101 and the RSU 102 separately. The server 103 receives driving-related information from the vehicle 101 and/or the RSU 102, and sends indication information to the vehicle 101. The vehicle 101 receives the indication information from the server 103, and automatically drives.

The vehicle 101 is disposed with a vehicle-mounted terminal. The vehicle-mounted terminal may be ahead unit installed in the vehicle 101, or may be a terminal device located in the vehicle 101. This is not limited in this embodiment of this application.

The RSU 102 may be a service unit disposed on two sides of a road, and is configured to: exchange information with a vehicle, collect driving-related information of the road and the vehicle, and assist autonomous driving of the vehicle.

The server 103 is configured to: receive the driving-related information of the road and the vehicle, and send indication information to the vehicle 101. The server 103 may be, for example, a cloud server or a vehicle to X (vehicle to X, V2X) server.

It should be noted that main scenarios in embodiments of this application are in daily traffic driving, for example, any scenario such as car driving, ship driving, or motorcycle riding in which autonomous driving is used. For example, by using an autonomous driving technology, a vehicle is driven to automatically drive on a section of a road. Alternatively, by using an autonomous driving technology, a ship is driven to automatically sail on a section of a course.

The following describes the communications method in this application in detail by using specific embodiments. It should be noted that the following several specific embodiments may be combined with each other. Same or similar content is not described repeatedly in different embodiments.

Figure 3:
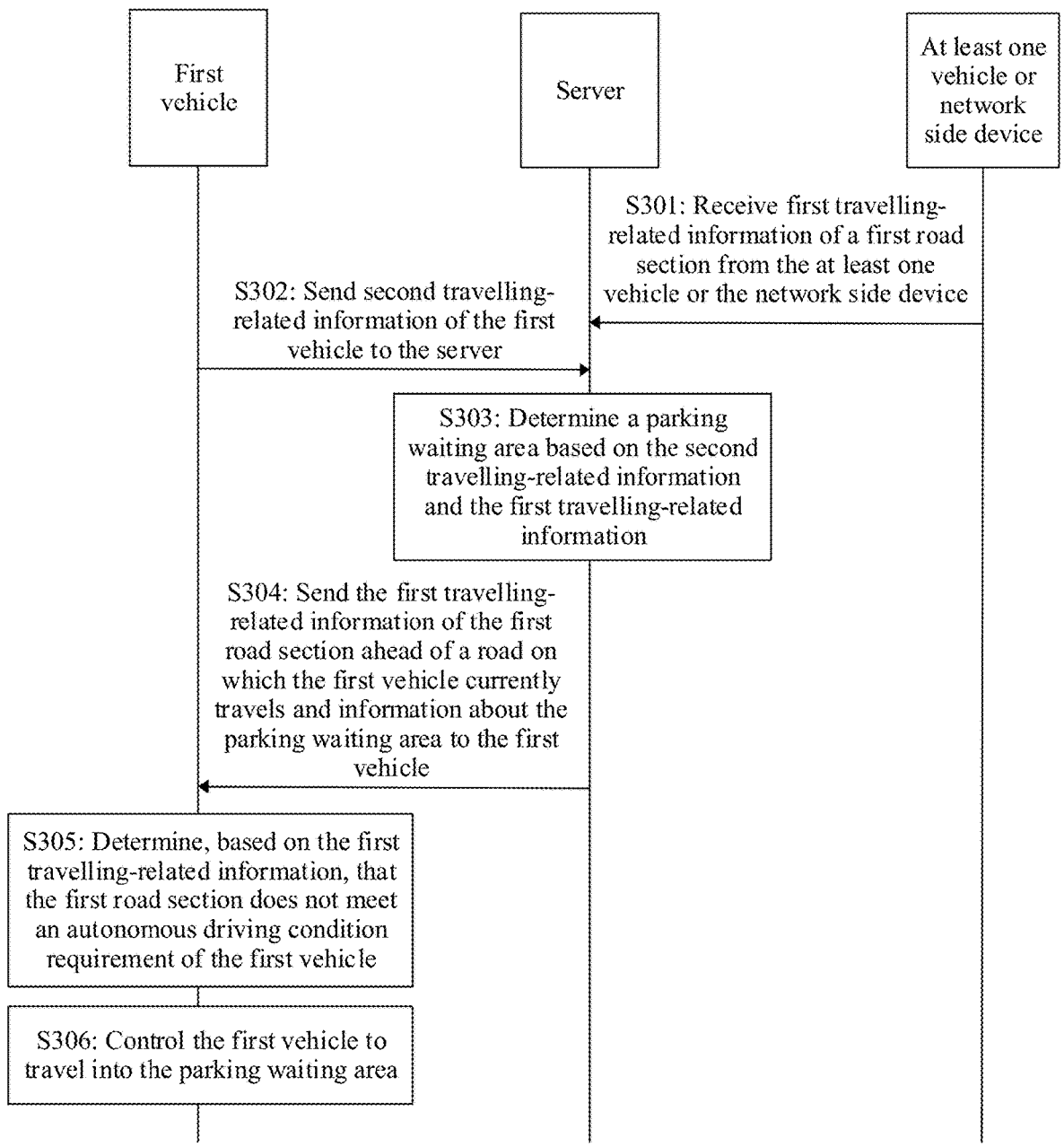
FIG. 3 is a signaling interaction diagram of an autonomous driving method according to an embodiment of this application.

FIG. 3 is a signaling interaction diagram of an autonomous driving method according to an embodiment of this application. This embodiment relates to a process of how a first vehicle drives, based on an information indication sent by a server, into a parking waiting area. As shown in FIG. 3, the method includes the following operations.

S301: The server receives first driving-related information of a first road section from at least one vehicle or a network side device.

The network side device is an RSU, and the first driving-related information is road-related driving information. For example, the first driving-related information includes but is not limited to a road condition restriction, definition of road markings and lines, a road administration level, a road technology level, a population density, a traffic volume, a weather condition, or a road emergency.

In some embodiments, when driving on a road, a vehicle collects first driving-related information of each road section in real time and actively reports the first driving-related information to the server. Alternatively, the server sends an information obtaining request to a vehicle in the first road section at intervals, and after receiving the information obtaining request, the vehicle reports the first driving-related information of the first road section at this time to the server.

In some other embodiments, the RSU is disposed on two sides of the road, and may collect first driving-related information of a passing vehicle in real time. If the RSU is disposed with a data collection device such as a camera component, the RSU can receive the first driving-related information of the first road section from the at least one vehicle, and can directly collect the first driving-related information of the first road section.

In addition, in some embodiments, the server may alternatively obtain the first driving-related information of the first road section in another way. For example, the server may obtain a satellite image of the first road section, and extract the first driving-related information of the first road section based on the satellite image of the first road section.

In this embodiment of this application, a frequency at which the server receives the first driving-related information of the first road section is not limited. The first driving related information may be received in real time, or may be received at an interval of a preset time, for example, may be obtained every 10 seconds. This may be specifically properly set based on an actual situation.

S302: The first vehicle sends second driving-related information of the first vehicle to the server.

The second driving-related information is vehicle-related driving information. For example, the second driving-related information includes but is not limited to an autonomous driving condition requirement the vehicle, an autonomous driving status, a current location, a planned driving route, or road condition information collected by the vehicle.

In this operation, that the first vehicle sends second driving-related information of the first vehicle to the server may be before the server receives the first driving-related information of the first road section from the at least one vehicle, or after the server receives the first driving-related information of the first road section from the at least one vehicle. This is not limited in this embodiment of this application. The second driving-related information may be directly sent by the first vehicle to the server, or may be forwarded to the server by using an RSU, a base station, or a relay.

In some embodiments, the first vehicle may send the first driving-related information of the first road section and the second driving-related information of the first vehicle to the server.

S303: The server determines a parking waiting area based on the second driving-related information and the first driving-related information. The parking waiting area is used to park the first vehicle before the first vehicle drives into the first road section.

In this operation, the server may determine the location of the first vehicle and the planned driving route based on the second driving related information, and may determine, based on information such as the road condition restriction in the first driving related information, locations at which the first vehicle can be parked, to determine the parking waiting area of the first vehicle.

It should be noted that there may be one or more parking waiting areas determined in this embodiment of this application. This is not limited in this embodiment of this application.

In some embodiments, the parking waiting area is set in advance. The server may determine, from preset parking waiting areas based on the second driving-related information and the first driving-related information, the parking waiting area suitable for parking the first vehicle. If there are a relatively large quantity of vehicles, the server may further properly plan parking waiting areas for different vehicles based on locations of the vehicles and a quantity of the vehicles.

In some other embodiments, the parking waiting area is temporarily planned. If the server does not set a parking waiting area, or the server does not set a parking waiting area for a road section on which the first vehicle is located, the server may temporarily plan a section of road or several lanes in a section of road as the parking waiting area for the vehicle to temporarily park.

In an embodiment, information about the parking waiting area is included in dynamic layer information of the map. Correspondingly, collection and processing of the second driving-related information and the first driving-related information may be completed by a map server, and then the information about the parking waiting area may be synchronously updated as a part of a dynamic layer of the map.

Figure 4:
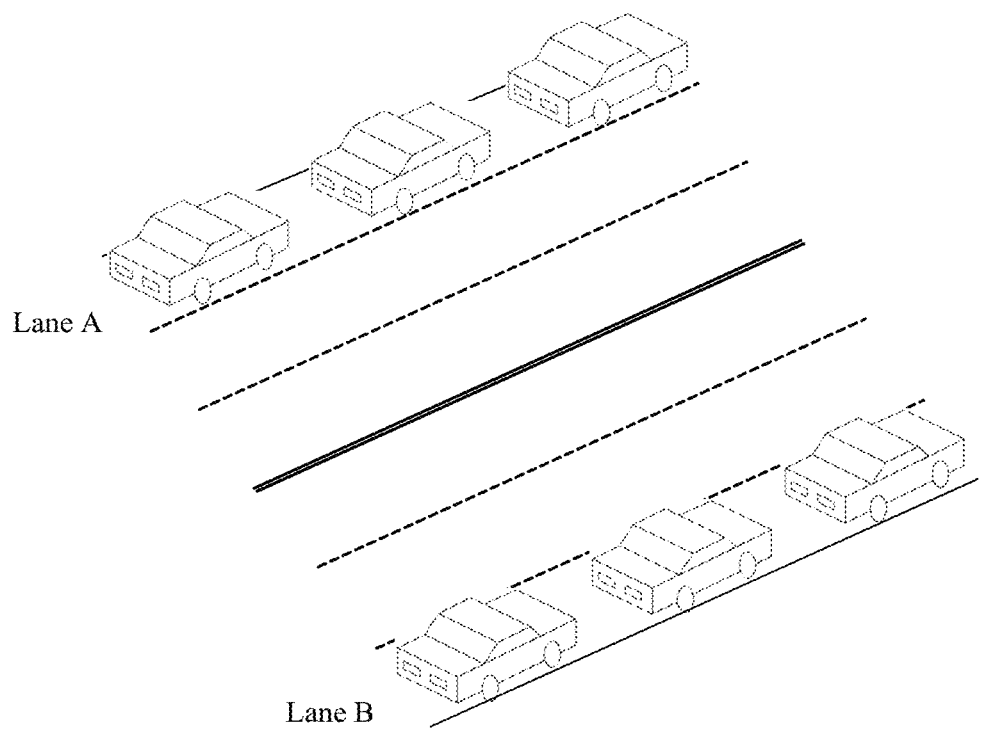
FIG. 4 is a schematic diagram of a parking waiting area according to an embodiment of this application.

FIG. 4 is a schematic diagram of a parking waiting area according to an embodiment of this application. As shown in FIG. 4, if a road in front of a vehicle temporarily encounters an extreme case not suitable for autonomous driving, a server may divide the parking waiting area on the road. For example, if the road is a bidirectional six-lane road, a lane A and a lane B on two sides may be divided into temporary waiting areas, and parking spaces are divided at an interval of five meters.

S304: The server sends the first driving-related information of the first road section ahead of the road on which the first vehicle currently drives and the information about the parking waiting area to the first vehicle.

In this operation, after obtaining the first driving-related information of the first road section and the second driving-related information of the first vehicle, and determining the parking waiting area based on the second driving-related information and the first driving-related information, the server may send the first driving-related information of the first road section ahead of the road on which the first vehicle currently drives and the information about the parking waiting area to the first vehicle.

The information about the parking waiting area may include: a lane number of the parking waiting area, a start location of the parking waiting area, a location of each parking space in the parking waiting area, and an occupation status of the parking space.

In some embodiments, if the server sends information about a plurality of parking waiting areas to the first vehicle, the server may further rank the information about the parking waiting areas in a recommended sequence, and may rank information about a parking waiting area that is closest to the first vehicle or that is least parked as the first.

S305: The first vehicle determines, based on the first driving-related information, that the first road section does not meet an autonomous driving condition requirement of the first vehicle.

In this operation, after receiving the first driving-related information of the first road section ahead of the road on which the first vehicle currently drives and the information about the parking waiting area that are sent by the server, the first vehicle may determine, based on the first driving-related information, that the first road section does not meet the autonomous driving condition requirement of the first vehicle.

The autonomous driving condition requirement of the first vehicle may be set by a manufacturer, or may be indicated by the server. The autonomous driving condition is not limited in this embodiment of this application, and may be specifically set based on an actual situation. For example, an autonomous driving condition may include but is not limited to that a road wind speed is lower than A, a rainfall amount at a location of the road is lower than B, a traffic flow of the road is lower than C, and there is no obstacle on the road.

S306: The first vehicle controls the first vehicle to drive into the parking waiting area.

In this operation, when the first vehicle determines, based on the first driving-related information, that the first road section does not meet the autonomous driving condition requirement of the first vehicle, the first vehicle controls the first vehicle to drive into the parking waiting area.

In an optional embodiment, before the first vehicle is controlled to drive into the parking waiting area, it may be further determined that no qualified driver takes over the first vehicle.

For example, if the first road section does not meet an autonomous driving condition requirement of a vehicle, a vehicle-mounted terminal may output first prompt information, where the first prompt information is used to prompt a driver of the vehicle to manually take over the vehicle.

The first prompt information may be a voice prompt, or may be a light prompt, or may be a text prompt on a display apparatus of the vehicle-mounted terminal. In this embodiment of this application, prompting may be performed in one or more of the foregoing manners.

Figure 5:
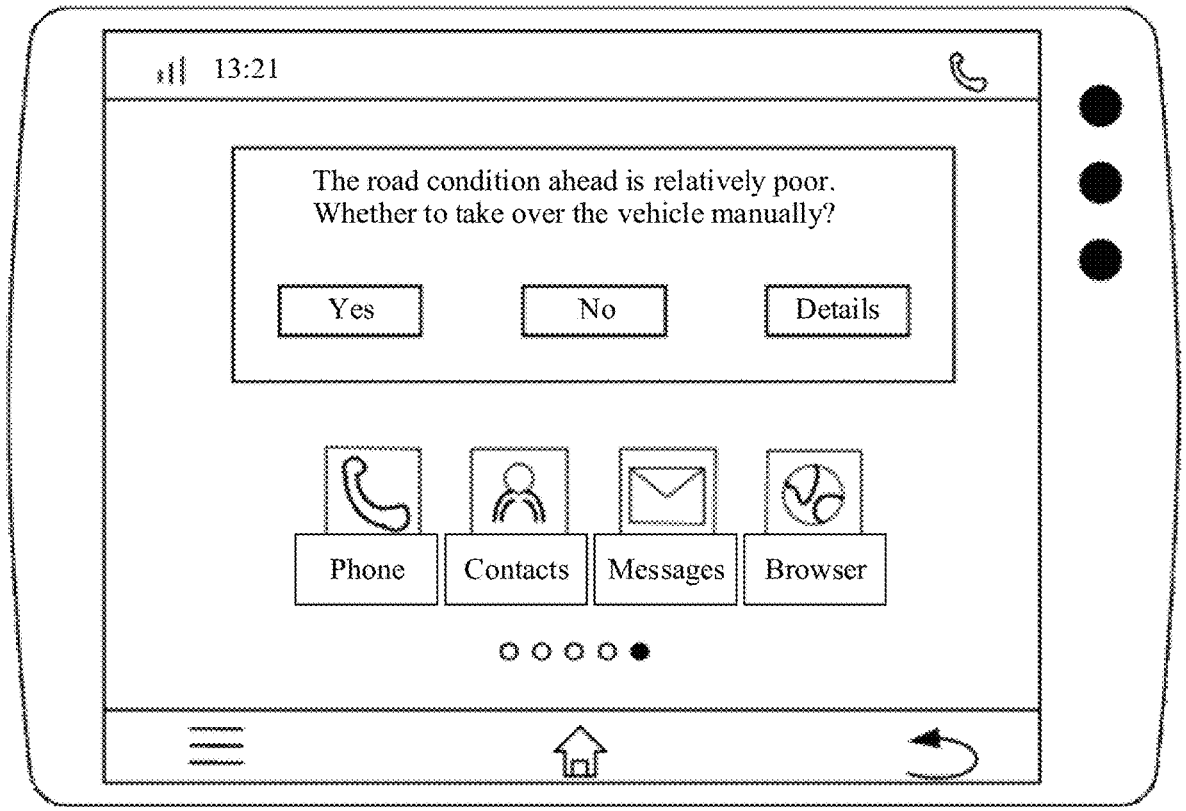
FIG. 5 is a schematic diagram of an interface of a vehicle-mounted terminal according to an embodiment of this application.

For example, FIG. 5 is a schematic diagram of an interface of a vehicle-mounted terminal according to an embodiment of this application. As shown in FIG. 5, after it is determined, based on the first driving-related information, that the first road section does not meet the autonomous driving condition requirement of the first vehicle, a first prompt box may pop up on an interface of a vehicle-mounted terminal of the first vehicle. The first prompt box displays text "The road condition ahead is relatively poor. Whether to take over the vehicle manually?", and is further provided with a first control marked with "Yes" and a second control marked with "No". If the driver triggers the first control, the driver manually takes over the vehicle, and the vehicle enters a manual driving mode. If the driver triggers the second control, the vehicle still automatically drives, and the vehicle automatically drives into the parking waiting area. A manner of triggering the control is not limited in this embodiment of this application. The driver may manually trigger the control, or may trigger the control by using a voice.

In an embodiment, the first prompt box may be further disposed with a third control, and the third control is marked with "Details". The driver may obtain detailed first driving-related information of the first road section by triggering the third control, so that the driver determines whether manual driving can be performed.

In addition, after the vehicle-mounted terminal sends the first prompt information, if it is still not detected after a first time period that the driver manually takes over the vehicle, the vehicle is controlled to drive into the parking waiting area.

The first time period is not limited in this embodiment of this application, and may be set based on a specific situation. For example, the first time period may be one minute or five minutes.

It should be noted that, if the first vehicle receives autonomous driving indication sent by the driver or a passenger, the first vehicle may directly control the vehicle to drive into the parking waiting area without waiting for an end of the first time period.

According to the autonomous driving method and apparatus provided in this embodiment of this application, first driving-related information of a first road section ahead of a road on which a first vehicle currently drives and information about a parking waiting area that are sent by a network side device are received, where the parking waiting area is used to park the first vehicle before the first vehicle drives into the first road section. Then, it is determined, based on the first driving-related information, that the first road section does not meet an autonomous driving condition requirement of the first vehicle. Finally, the first vehicle is controlled to drive into the parking waiting area. In this manner, when the first road section ahead of the road on which the first vehicle currently drives does not meet the autonomous driving condition requirement, the vehicle may automatically drive into the parking waiting area, to implement safe parking, thereby reducing a safety risk.

It should be understood that, in the embodiment shown in FIG. 3, operation 302 is optional. In operation 303, the server may not use the second driving-related information of the first vehicle when determining the parking waiting area. It may be understood that the parking waiting area may not be customized for the first vehicle. Correspondingly, the server may broadcast information about the parking waiting area to a plurality of vehicles including the first vehicle.

Figure 6:
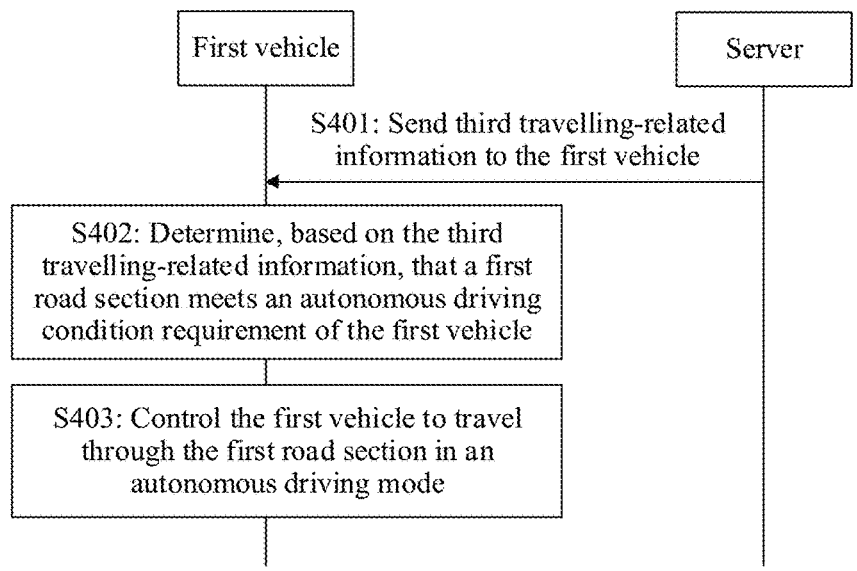
FIG. 6 is another signaling interaction diagram of an autonomous driving method according to an embodiment of this application.

Based on the foregoing embodiment, the following describes how to drive the vehicle away from the parking waiting area. FIG. 6 is another signaling interaction diagram of an autonomous driving method according to an embodiment of this application. This embodiment relates to a process of driving a vehicle away from a parking waiting area. As shown in FIG. 6, the method includes the following operations.

S401: A server sends third driving-related information to a first vehicle, where the third driving-related information is an update of first driving-related information.

In this operation, after the first vehicle drives into a parking waiting area, the server may further send the third driving-related information to the first vehicle, to notify the first vehicle of a road condition of a first road section in real time.

It should be noted that the first driving-related information and the third driving-related information are information about a same object at different time points.

S402: The first vehicle determines, based on the third driving-related information, that the first road section meets an autonomous driving condition requirement of the first vehicle.

In some embodiments, if the first vehicle determines, based on the third driving-related information, that the first road section meets the autonomous driving condition requirement of the first vehicle, the first vehicle may further query, by outputting second prompt information, whether a driver or a passenger in the vehicle controls the vehicle to drive away from the parking waiting area.

The second prompt information may be a voice prompt, or may be a light blink prompt, or may be a text prompt on a display apparatus of a vehicle-mounted terminal. In this embodiment of this application, prompting may be performed in one or more of the foregoing manners.

Figure 7:
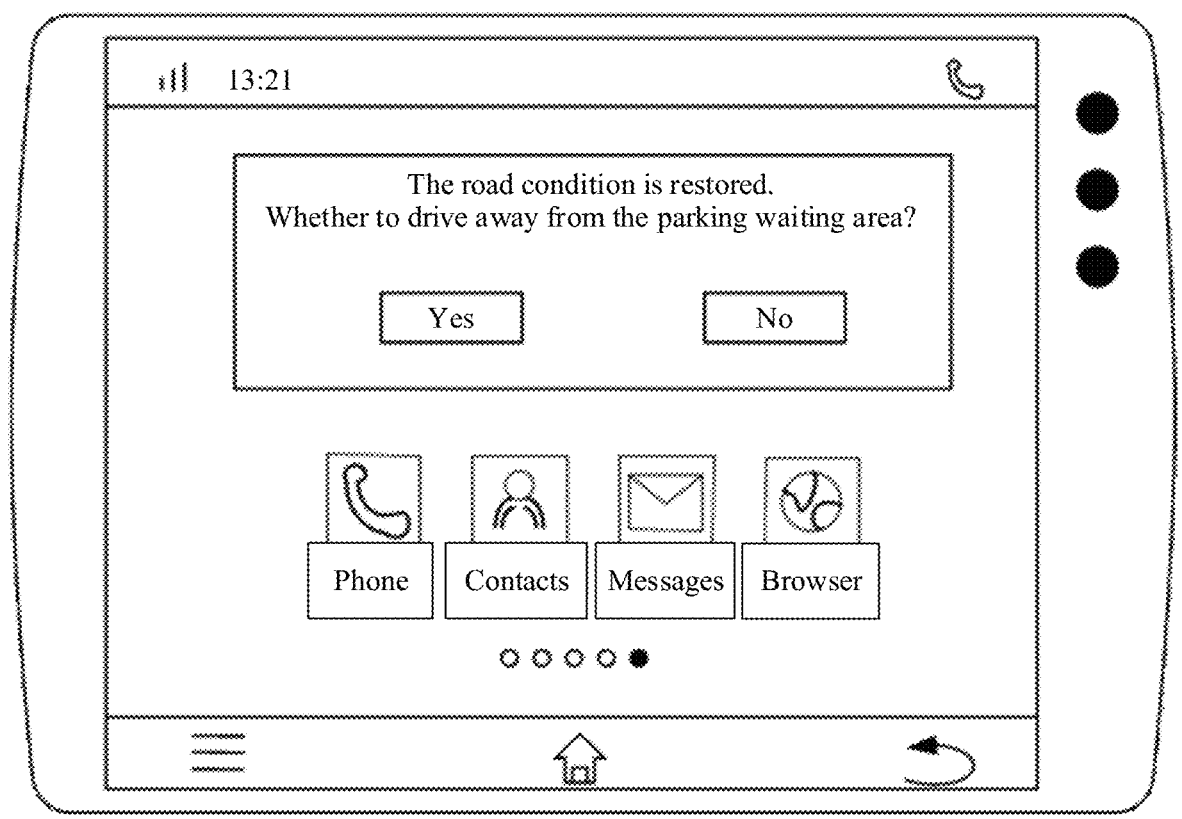
FIG. 7 is another schematic diagram of an interface of a vehicle-mounted terminal according to an embodiment of this application.

For example, FIG. 7 is another schematic diagram of an interface of a vehicle-mounted terminal according to an embodiment of this application. As shown in FIG. 7, if the first road section meets the autonomous driving condition requirement of the first vehicle, a second prompt box may pop up on an interface of a vehicle-mounted terminal. The second prompt box displays text "The road condition is restored. Whether to leave the parking waiting area?", and is further provided with a fourth control marked with "Yes" and a fifth control marked with "No". If the driver or the passenger triggers the fourth control, the vehicle is controlled to drive away from the parking waiting area, and instruction information is sent. If the driver or the passenger triggers the fifth control, the vehicle is still parked in the parking waiting area. A manner of triggering the control is not limited. The driver may manually trigger the control, or may trigger the control by using a voice.

S403: The first vehicle controls the first vehicle to drive through the first road section in an autonomous driving mode.

In some embodiments, after the first vehicle is controlled to drive into the parking waiting area, the method further includes outputting request information to a user of the first vehicle, where the request information is used to request the user to indicate any one of the following content: whether the vehicle can drive out of the first road section through remote driving, whether the vehicle can drive out of the first road section through guidance based on a route and a time planned by a server, or whether the vehicle can follow another vehicle to drive out of the first road section.

Correspondingly, according to an instruction of the user, the vehicle directly drives out of the first road section through remote driving, or drives out of the first road section based on the route and the time planned by the server, or follows the another vehicle to drive out of the first road section According to the autonomous driving method provided in this embodiment of this application, a server sends third driving-related information to a first vehicle, where the third driving-related information is an update of first driving-related information. Then, the first vehicle determines, based on the third driving-related information, that the first road section meets an autonomous driving condition requirement of the first vehicle. Finally, the first vehicle controls the first vehicle to drive through the first road section in an autonomous driving mode. In the foregoing manner, after a road condition is restored, a vehicle parked in a parking waiting area can drive away from the parking waiting area in time. This helps quickly restore traffic.

It should be understood that in the embodiments shown in FIG. 3 and FIG. 6, information exchange between the first vehicle and the server may be direct interaction, or may be indirect interaction forwarded by using a base station, a road side unit, or another relay device.

Figure 8A:
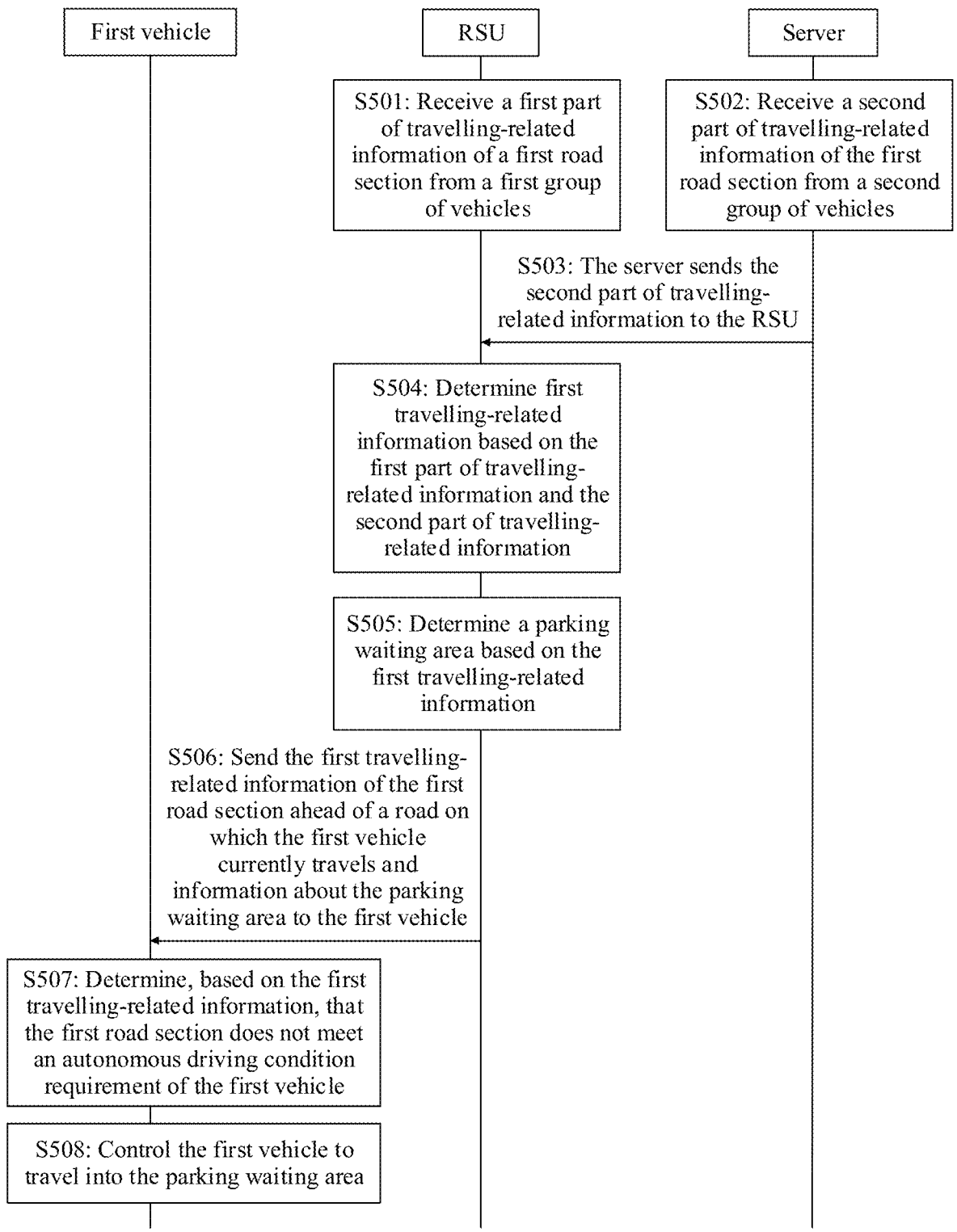
FIG. 8(a) is still another signaling interaction diagram of an autonomous driving method according to an embodiment of this application.

In this application, first driving-related information may be collected by using a server, or may be collected by using an RSU. FIG. 8(a) is still another signaling interaction diagram of an autonomous driving method according to an embodiment of this application. The method includes the following operations.

S501: An RSU receives a first part of driving-related information of a first road section from a first group of vehicles.

S502: A server receives a second part of driving-related information of the first road section from a second group of vehicles.

There is no certain time sequence between S501 and S502, and both S501 and S502 may be performed as routine road monitoring work of the RSU and the server. There may be mixing between the first group of vehicles and the second group of vehicles, or there may be no mixing.

S503: The server sends the second part of driving-related information to the RSU.

Generally, compared with the RSU, the server may collect road information more widely, and the sending, by the server, the second part of driving-related information to the RSU may be used as a supplement or correction to the first part of driving-related information collected by the RSU.

S504: The RSU determines first driving-related information based on the first part of driving-related information and the second part of driving-related information.

S505: The RSU determines a parking waiting area based on the first driving-related information.

S506: The RSU sends the first driving-related information of the first road section ahead of a road on which a first vehicle currently drives and information about the parking waiting area to the first vehicle.

This operation may be implemented based on that the RSU broadcasts a message to a plurality of vehicles including the first vehicle, or may be implemented based on that peer-to-peer communication is established between the RSU and the first vehicle.

S507: The first vehicle determines, based on the first driving-related information, that the first road section does not meet an autonomous driving condition requirement of the first vehicle.

S508: The first vehicle drives into the parking waiting area.

Figure 8B:
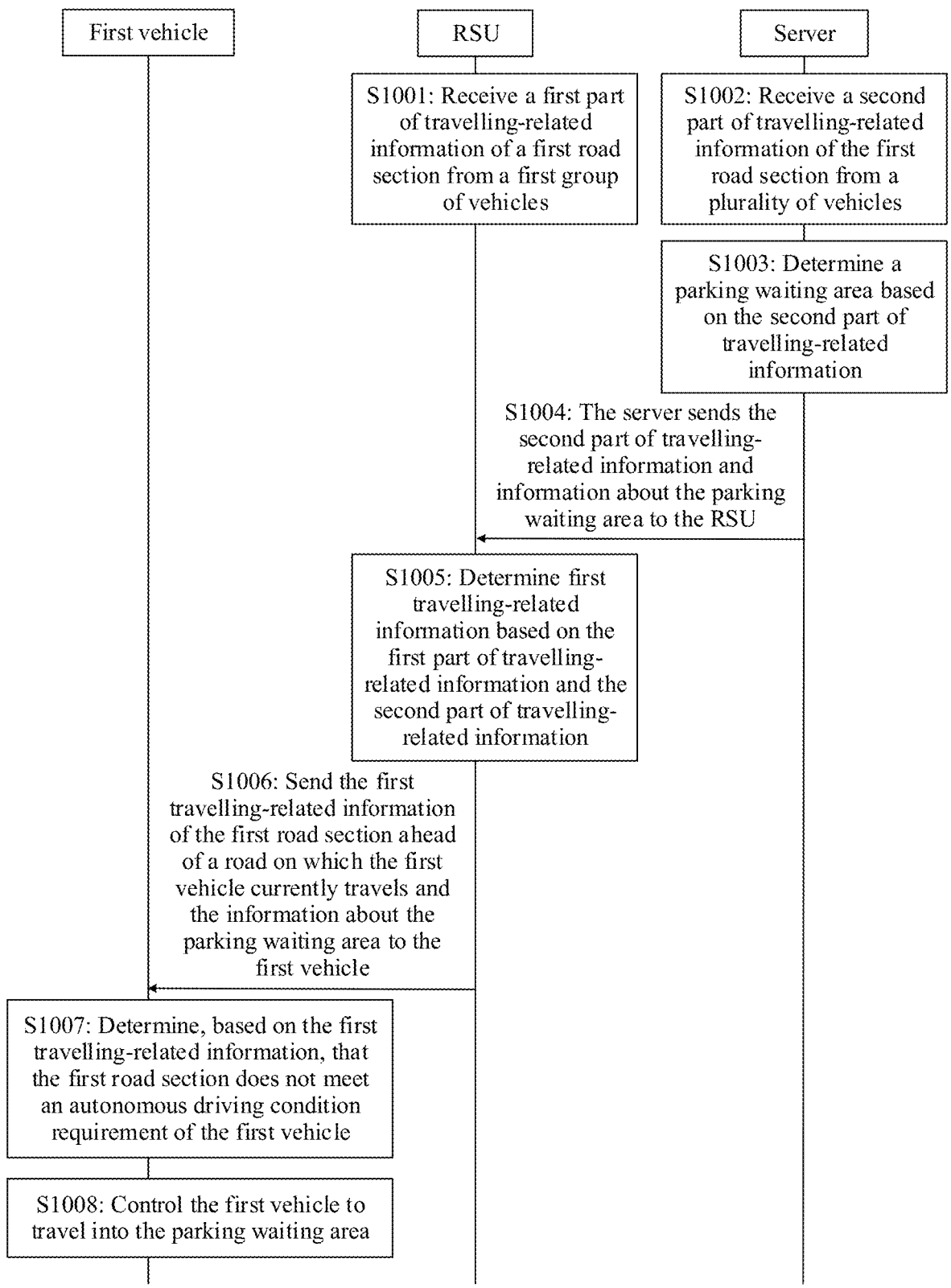
FIG. 8(b) is yet another signaling interaction diagram of an autonomous driving method according to an embodiment of this application.

In the embodiment shown in FIG. 8(a), the parking waiting area is determined by the RSU based on the first part of driving-related information collected by the RSU and the second part of driving-related information collected by the server. In addition, the parking waiting area may alternatively be determined by the server, and then forwarded to the first vehicle by using the RSU. A reference basis for determining the parking waiting area by the server may be only driving-related information of a related road section that is collected by the server from another vehicle or a network side device, and may further include driving-related information of the related road section that is reported by the RSU or the first vehicle to the server. FIG. 8(b) is yet another signaling interaction diagram of an autonomous driving method according to an embodiment of this application. FIG. 8(b) shows an embodiment of the present application in which a parking waiting area is determined by a server, including operations S1001 to S1008. S1001, S1002, S1005, S1006, S1007 and S1008 are respectively the same as S501, S502, S504, S506, S507 and S508 in FIG. 8(a). A difference lies in that this embodiment includes the following operations.

S1003: The server determines a parking waiting area based on the second part of driving-related information.

S1004: The server sends the second part of driving-related information and information about the parking waiting area to the RSU.

A person of ordinary skill in the art may understand that all or some of the operations of the method embodiments may be implemented by a program instructing relevant hardware. The program may be stored in a computer-readable storage medium. When the program runs, the operations of the method embodiments are performed. The foregoing storage medium includes any medium that can store program code, such as a ROM, a RAM, a magnetic disk, or an optical disc.

Figure 9:
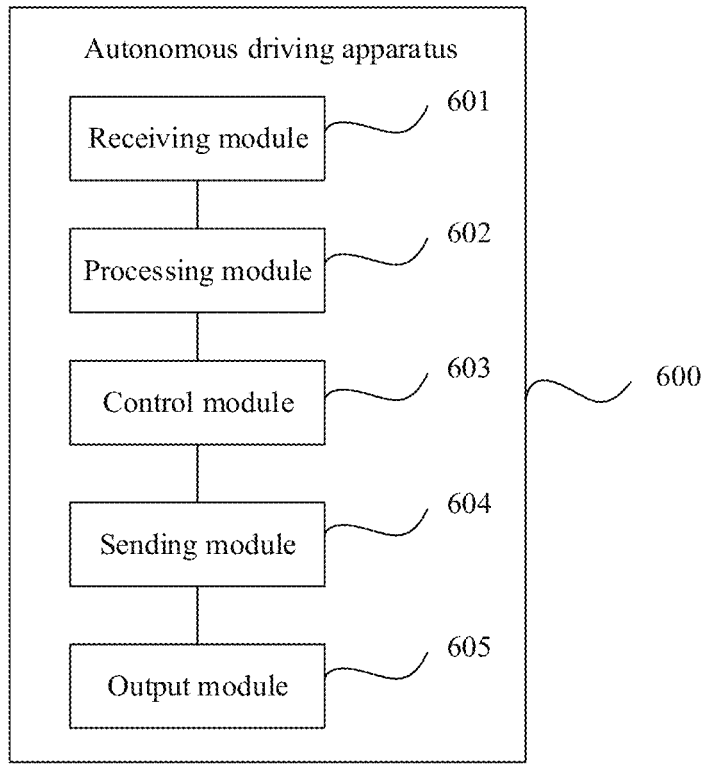
FIG. 9 is a schematic diagram of a structure of an autonomous driving apparatus according to an embodiment of this application.

FIG. 9 is a schematic diagram of a structure of an autonomous driving apparatus according to an embodiment of this application. The autonomous driving apparatus may be the first vehicle in FIG. 3, FIG. 6, FIG. 8(a), or FIG. 8(b), the vehicle-mounted device of the first vehicle, or a subsystem, a component, or a chip of the vehicle-mounted device. The vehicle-mounted device may be a head unit or a device located on the vehicle. The autonomous driving apparatus may be configured to perform the autonomous driving method on a first vehicle side in the foregoing embodiments. As shown in FIG. 9, the autonomous driving apparatus 600 includes a receiving module 601, a processing model 602, a control module 603, a sending module 604, and an output module 605.

The receiving module 601 is configured to receive first driving-related information of a first road section ahead of a road on which a first vehicle currently drives and information about a parking waiting area that are sent by a network side device, where the parking waiting area is used to park the first vehicle before the first vehicle drives into the first road section.

The processing module 602 is configured to determine, based on the first driving-related information, that the first road section does not meet an autonomous driving condition requirement of the first vehicle.

The control module 603 is configured to control the first vehicle to drive into the parking waiting area.

In an embodiment, the information about the parking waiting area is included in dynamic layer information of a map.

In an embodiment, the sending module 604 of the apparatus is configured to: before the receiving module receives the first driving-related information of the first road section ahead of the road on which the first vehicle currently drives and the information about the parking waiting area that are sent by the network side device, send second driving-related information of the first vehicle to the network side device.

In an embodiment, the processing module 602 is further configured to: before the control module controls the first vehicle to drive into the parking waiting area, determine that no qualified driver takes over the first vehicle.

In an embodiment, the receiving module 601 is further configured to: after the control module controls the first vehicle to drive into the parking waiting area, receive third driving-related information of the first road section that is sent by the network side device, where the third driving-related information is an update of the first driving-related information, and determine, based on the third driving-related information, that the first road section meets the autonomous driving condition requirement of the first vehicle.

The control module 603 is further configured to control the first vehicle to drive through the first road section in an autonomous driving mode.

In an embodiment, the apparatus further includes an output module 605, configured to: after the control module controls the first vehicle to drive into the parking waiting area, output request information to a user of the first vehicle, where the request information is used to request the user to indicate any one of the following content: whether the vehicle can drive out of the first road section through remote driving, whether the vehicle can drive out of the first road section through guidance based on a route and a time planned by a server, or whether the vehicle can follow another vehicle to drive out of the first road section.

In an embodiment, the information about the parking waiting area may include: a lane number of the parking waiting area, a start location of the parking waiting area, a location of each parking space in the parking waiting area, or an occupation status of the parking space.

The autonomous driving apparatus in this embodiment may implement the autonomous driving method on the first vehicle side in the foregoing embodiments, and specific implementation principles and implementation processes thereof are similar to the content in the foregoing embodiments, and details are not described herein again.

Figure 10:
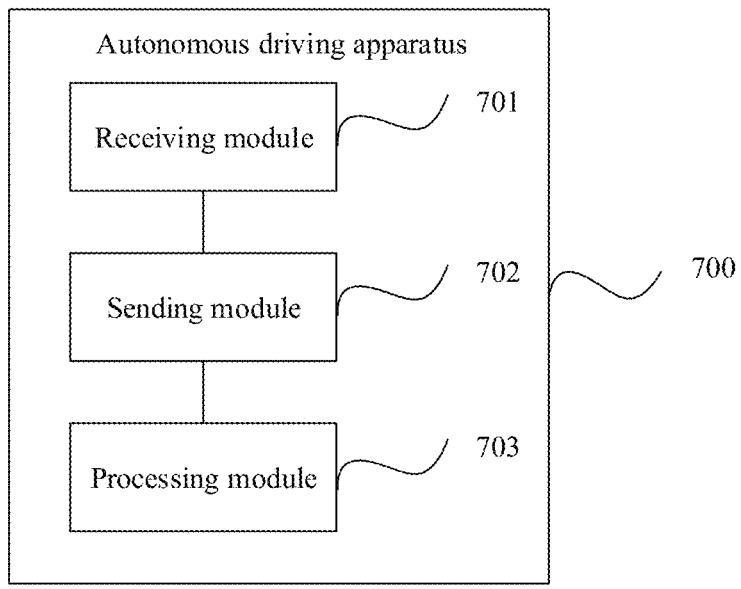
FIG. 10 is a schematic diagram of a structure of another autonomous driving apparatus according to an embodiment of this application.

FIG. 10 is a schematic diagram of a structure of another autonomous driving apparatus according to an embodiment of this application. The autonomous driving apparatus may be the server in FIG. 3 or FIG. 6, or the RSU in FIG. 8(*a*) or FIG. 8(*b*), or a subsystem, a component, or a chip in the server or the RSU. The autonomous driving apparatus may be configured to perform the autonomous driving method on a server side or an RSU side in the foregoing embodiments. As shown in FIG. 10, the autonomous driving apparatus 700 includes a receiving module 701, a sending module 702, and a processing module 703.

The receiving module 701 is configured to receive first driving-related information of a first road section from at least one vehicle or a network side device.

The sending module 702 is configured to send the first driving-related information and information about a parking waiting area to a first vehicle, where the first road section is located ahead of a road on which the first vehicle currently drives, and the parking waiting area is used to park the first vehicle before the first vehicle drives into the first road section.

In an embodiment, the information about the parking waiting area is included in dynamic layer information of a map.

In an embodiment, the receiving module is further configured to: before the sending module sends the first driving-related information and the information about the parking waiting area to the first vehicle, receive second driving-related information of the first vehicle from the first vehicle.

The processing module 703 of the apparatus is configured to determine the parking waiting area based on the second driving-related information and the first driving-related information.

In an embodiment, the sending module 702 is further configured to send third driving-related information to the first vehicle, where the third driving-related information is an update of the first driving-related information.

In an embodiment, the information about the parking waiting area may include: a lane number of the parking waiting area, a start location of the parking waiting area, a location of each parking space in the parking waiting area, or an occupation status of the parking space.

The autonomous driving apparatus in this embodiment may implement the autonomous driving method on a server side or on an RSU side in the foregoing embodiments. Specific implementation principles and implementation processes thereof are similar to the content in the foregoing embodiments, and details are not described herein again.

Only one or more of the modules in the embodiments shown in FIG. 9 and FIG. 10 may be implemented by software, hardware, firmware, or a combination thereof. The software or firmware includes but is not limited to computer program instructions or code, and may be executed by a hardware processor. The hardware includes but is not limited to various types of integrated circuits.

Figure 11:
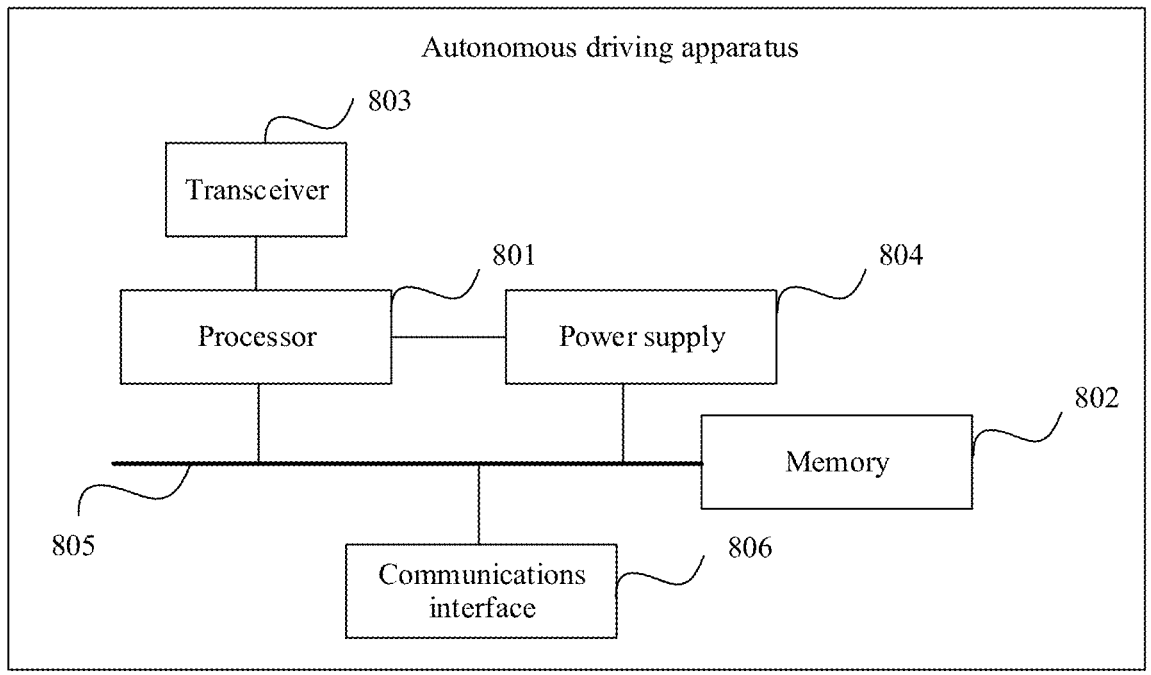
FIG. 11 is a schematic diagram of a structure of still another autonomous driving apparatus according to an embodiment of this application.

FIG. 11 is a schematic diagram of a structure of still another autonomous driving apparatus according to an embodiment of this application. The autonomous driving apparatus may be the first vehicle in FIG. 3, FIG. 6, FIG. 8(*a*), or FIG. 8(*b*), the vehicle-mounted device of the first vehicle, or a subsystem, a component, or a chip of the vehicle-mounted device. The vehicle-mounted device may be a head unit or a device located on the vehicle. The autonomous driving apparatus may be configured to perform the autonomous driving method on a first vehicle side in the foregoing embodiments. As shown in FIG. 11, the autonomous driving apparatus may include a processor 801 (for example, a CPU), a memory 802, and a transceiver 803. The transceiver 803 is coupled to the processor 801, and the processor 801 controls receiving and transmitting actions of the transceiver 803. The memory 802 may include a high-speed random access memory (RAM), or may further include a non-volatile memory (NVM), for example, at least two disk memories, and the memory 802 may store various instructions, to complete various processing functions and implement method operations in this application. In an implementation, the autonomous driving apparatus in this application may further include a power supply 804, a communications bus 805, and a communications port 806. The transceiver 803 may be integrated into a transceiver of the autonomous driving apparatus, or may be an independent transceiver antenna on the autonomous driving apparatus. The communications bus 805 is configured to implement communications connections between elements. The communications port 806 is configured to implement connection and communication between the autonomous driving apparatus and another peripheral.

In this embodiment of this application, the memory 802 is configured to store computer-executable program code, and the program code includes instructions. When the processor 801 executes the instructions, the instructions enable the processor 801 of the autonomous driving apparatus to perform a processing action of the first vehicle in the foregoing method embodiments, and enable the transceiver 803 to perform the receiving and transmitting actions of the first vehicle in the foregoing method embodiments. An implementation principle and a technical effect thereof are similar. Details are not described herein again.

Figure 12:
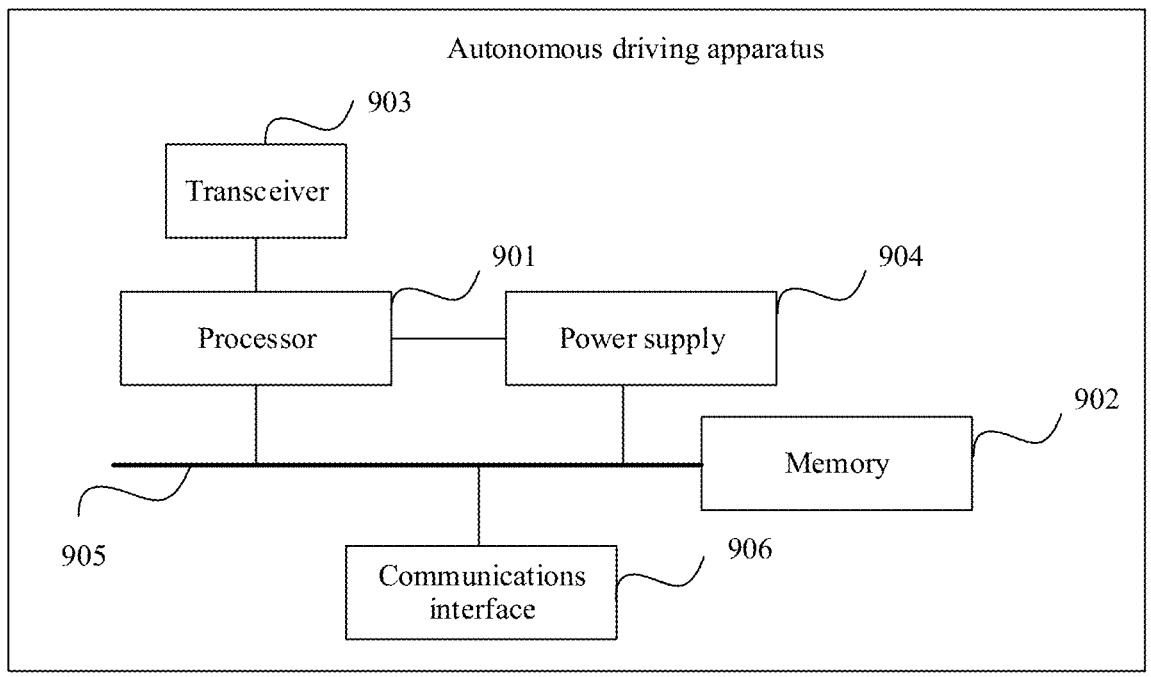
FIG. 12 is a schematic diagram of a structure of yet another autonomous driving apparatus according to an embodiment of this application.

FIG. 12 is a schematic diagram of a structure of yet another autonomous driving apparatus according to an embodiment of this application. The autonomous driving apparatus may be the server in FIG. 3 or FIG. 6, or the RSU in FIG. 8(*a*) or FIG. 8(*b*), or a subsystem, a component, or a chip in the server or the RSU. The autonomous driving apparatus may be configured to perform the autonomous driving method on a server side or an RSU side in the foregoing embodiments. As shown in FIG. 12, the autonomous driving apparatus may include a processor 901 (for example, a CPU), a memory 902, and a transceiver 903. The transceiver 903 is coupled to the processor 901, and the processor 901 controls receiving and transmitting actions of the transceiver 903. The memory 902 may include a high-speed random access memory (RAM), or may further include a non-volatile memory (NVM), for example, at least two disk memories, and the memory 902 may store various instructions, to complete various processing functions and implement method operations on the server side or on the RSU side in this application. In an implementation, the autonomous driving apparatus in this application may further include a power supply 904, a communications bus 905, and a communications port 906. The transceiver 903 may be integrated into a transceiver of the autonomous driving apparatus, or may be an independent transceiver antenna on the autonomous driving apparatus. The communications bus 905 is configured to implement communication connections between elements. The communications port 906 is configured to implement connection and communication between the autonomous driving apparatus and another peripheral.

In this embodiment of this application, the memory 902 is configured to store computer-executable program code, and the program code includes instructions. When the processor 901 executes the instructions, the instructions enable the processor 901 of the autonomous driving apparatus to perform a processing action on the server side or the RSU side in the foregoing method embodiments, and enable the transceiver 903 to perform the receiving and transmitting actions on the server side or the RSU side in the foregoing method embodiments. An implementation principle and a technical effect thereof are similar. Details are not described herein again.

The following uses a vehicle-mounted terminal as an example to describe each component of an autonomous driving apparatus on a first vehicle side in detail.

Figure 13:
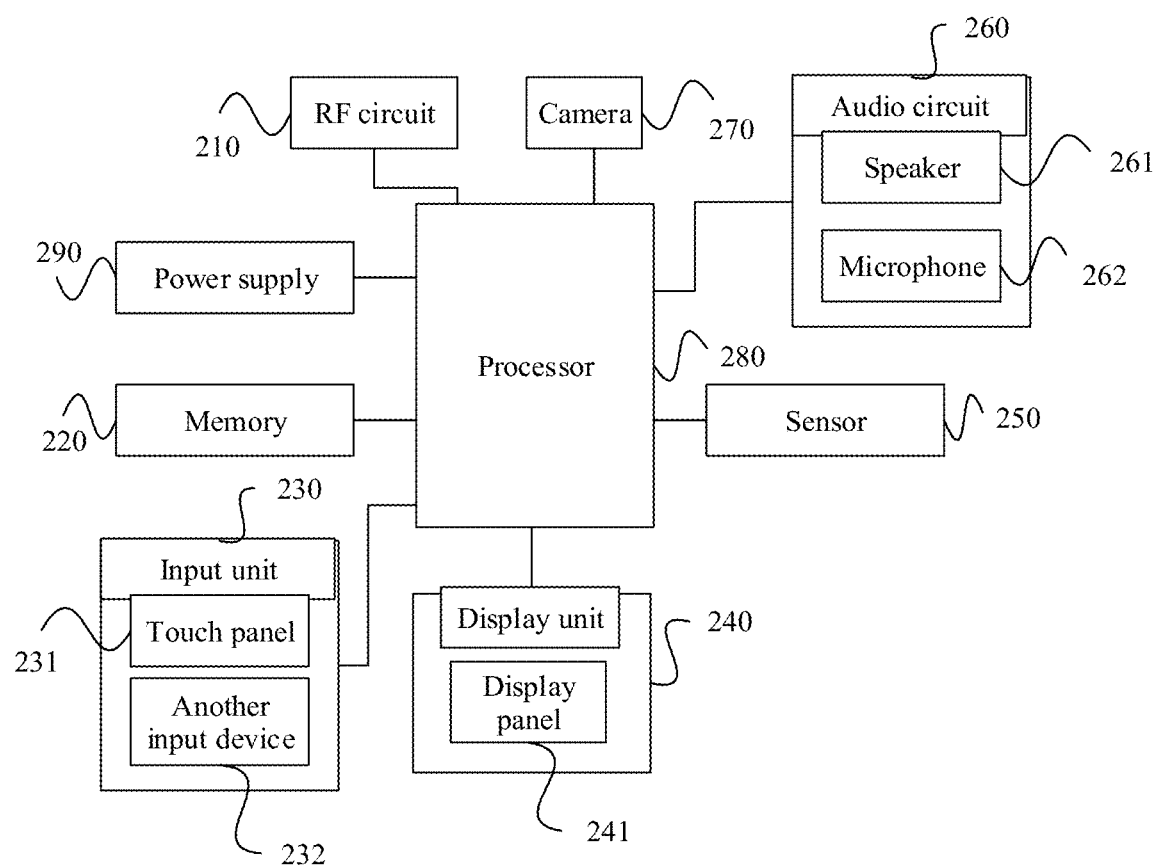
FIG. 13 is a schematic diagram of a structure of a vehicle-mounted terminal according to an embodiment of this application.

FIG. 13 is a schematic diagram of a structure of a vehicle-mounted terminal according to an embodiment of this application. As shown in FIG. 13, the vehicle-mounted terminal includes components such as a radio frequency (RF) circuit 210, a memory 220, an input unit 230, a display unit 240, a sensor 250, an audio circuit 260, a camera 270, a processor 280, and a power supply 290. A person skilled in the art may understand that the structure of the vehicle-mounted terminal shown in FIG. 13 constitutes no limitation on the vehicle-mounted terminal, and the vehicle-mounted terminal may include more or fewer components than those shown in the figure, may combine some components, or have different component arrangements.

The RF circuit 210 may be configured to: receive and send signals during information receiving and sending or during a call. In particular, after receiving downlink information of a base station, the RF circuit 210 sends the downlink information to the processor 280 for processing; and in addition, sends related uplink data to a base station. The RF circuit 210 usually includes but is not limited to an antenna, at least one amplifier, a transceiver, a coupler, a low noise amplifier (LNA), and a duplexer. In addition, the RF circuit 210 may further communicate with a network and another device through wireless communication. The wireless communication may use any communication standard or protocol, including but not limited to a global system for mobile communications (GSM), a general packet radio service (GPRS), code division multiple access (CDMA), wideband code division multiple access (WCDMA), long term evolution (LTE), an e-mail, a short message service (SMS), and the like.

The memory 220 may be configured to store a software program and a module. The processor 280 performs various function applications of the vehicle-mounted terminal and data processing by running the software program and the module that are stored in the memory 220. The memory 220 may mainly include a program storage area and a data storage area, where the program storage area may store an operating system, an application program for implementing at least one function (such as a sound playing function or an image playing function), and the like, and the data storage area may store data (such as audio data or a phonebook) that is created based on use of the vehicle-mounted terminal, and the like. In addition, the memory 220 may include a high-speed random access memory, or may include a nonvolatile memory such as at least one magnetic disk storage device, a flash memory, or another volatile solid-state storage device.

The input unit 230 may be configured to receive input numeral or character information, and generate key signal input related to driver setting and function control of the vehicle-mounted terminal. Specifically, the input unit 230 may include a touch panel 231 and another input device 232. The touch panel 231, also referred to as a touchscreen, may collect a touch operation of the driver on or near the touch panel 231 (such as an operation of the driver on or near the touch panel 231 by using any suitable object or accessory such as a finger or a stylus), and drive a corresponding connection apparatus according to a preset program. In one embodiment, the touch panel 231 may include two parts: a touch detection apparatus and a touch controller. The touch detection apparatus detects a touch location of the driver, detects a signal brought by the touch operation, and delivers the signal to the touch controller. The touch controller receives touch information from the touch detection apparatus, converts the touch information into touch point coordinates, sends the touch point coordinates to the processor 280, and receives and executes a command sent by the processor 280. In addition, the touch panel 231 may be implemented in a plurality of types, such as a resistive type, a capacitive type, an infrared type, and a surface acoustic wave type. In addition to the touch panel 231, the input unit 230 may further include the another input device 232. Specifically, the another input device 232 may include but is not limited to one or more of a physical keyboard, a function button (such as a volume control button or a power button), a trackball, a mouse, a joystick, and the like.

The display unit 240 may be configured to display information input by the driver or information provided for the driver, and various menus of the vehicle-mounted terminal. The display unit 240 may include a display panel 241. In one embodiment, the display panel 241 may be configured in a form of a liquid crystal display (LCD), an organic light-emitting diode (OLED), or the like. Further, the touch panel 231 may cover the display panel 241. After detecting the touch operation on or near the touch panel 231, the touch panel 231 transfers the touch operation to the processor 280, to determine a type of a touch event. Subsequently, the processor 280 provides a corresponding visual output on the display panel 241 based on the type of the touch event. Although in FIG. 13, the touch panel 231 and the display panel 241 serve as two independent components to implement input and input functions of the vehicle-mounted terminal. However, in some embodiments, the touch panel 231 and the display panel 241 may be integrated to implement the input and output functions of the vehicle-mounted terminal.

In an embodiment, the vehicle-mounted terminal may further include at least one sensor 250, such as a light sensor, a motion sensor, and another sensor. Specifically, the optical sensor may include an ambient light sensor and a proximity sensor. The ambient light sensor may adjust luminance of the display panel 241 based on brightness of ambient light. The proximity sensor may power off the display panel 241 and/or backlight when the vehicle-mounted terminal moves to an ear. As a type of motion sensor, an acceleration sensor can detect a value of an acceleration in each direction (generally three axes), and detect a value and a direction of gravity when the acceleration sensor is static, and is applicable to an application for recognizing a vehicle-mounted terminal posture (for example, switching between a landscape screen and a portrait screen, related games, and magnetometer posture calibration), a function related to vibration recognition (such as a pedometer or a knock), and the like. Other sensors such as a gyroscope, a barometer, a hygrometer, a thermometer, and an infrared sensor may also be disposed on the vehicle-mounted terminal. Details are not described herein.

The audio circuit 260, a loudspeaker 261, and a microphone 262 may provide an audio interface between the driver and the vehicle-mounted terminal. The audio circuit 260 may convert received audio data into an electrical signal, and then transmit the electrical signal to the speaker 261, and the speaker 261 converts the electrical signal into a sound signal for output. In addition, the microphone 262 converts a collected sound signal into an electrical signal. The audio circuit 260 receives the electrical signal, converts the electrical signal into audio data, and then outputs the audio data to the processor 280 for processing. After the processing, the processor 280 sends the audio data to, for example, another terminal by using the RF circuit 210, or outputs the audio data to the memory 220 for further processing.

The camera 270 in the in-vehicle terminal may obtain an optical image, including an infrared light image and/or a visible light image. There may be one or at least two cameras (not shown in the figure) in the vehicle-mounted terminal. This may be specifically adjusted based on an actual design requirement.

The processor 280 is a control center of the vehicle-mounted terminal, and is connected to all the parts of the entire vehicle-mounted terminal by using various interfaces and lines, and perform various functions of the vehicle-mounted terminal and data processing by running or executing the software program and/or the module that are/is stored in the memory 220 and by invoking data stored in the memory 220, to perform overall monitoring on the vehicle-mounted terminal. In one embodiment, the processor 280 may include one or more processing units. Preferably, an application processor and a modem processor may be integrated into the processor 280. The application processor mainly processes an operating system, a driver interface, an application, and the like. The modem processor mainly processes wireless communication. It may be understood that the modem processor may not be integrated into the processor 280.

The vehicle-mounted terminal further includes the power supply 290 (such as a battery) that supplies power to all the parts. Preferably, the power supply may be logically connected to the processor 180 by using a power management system, so that functions such as charging and discharging management and power consumption management are implemented by using the power management system.

Although not shown in the figure, the vehicle-mounted terminal may further include a Bluetooth module, and the like. Details are not described herein.

An embodiment of this application further provides a chip, including a processor and an interface. The interface is configured to input/output data or instructions processed by the processor. The processor is configured to perform the methods provided in the foregoing method embodiments. The chip may be applied on a server side or an RSU side, or may be applied to a vehicle-mounted terminal of the first vehicle.

An embodiment of this application further provides a program. The program is configured to perform the method provided in the foregoing method embodiments when executed by a processor.

An embodiment of this application further provides a program product, for example, a computer-readable storage medium. The program product stores instructions. When the instructions are run on a computer, the computer performs the method provided in the foregoing method embodiments.

An embodiment of this application provides a chip, including: a memory and a processor. The memory is configured to store program instructions. The processor is configured to invoke the program instructions in the memory to perform the method provided in the foregoing method embodiments.

All or some of the embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to embodiments of the present application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital driver line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk solid-state disk (SSD)), or the like.

What is claimed is:

1. An autonomous driving apparatus, comprising:
   at least one processor; and
   at least one memory storing program instructions, wherein the at least one processor is coupled to the at least one memory to execute the instructions to:
   receive, from a network side device, first driving-related information of a first road section ahead of a road on which a first vehicle currently drives and information about a parking waiting area to park the first vehicle before the first vehicle drives into the first road section;
   determine, based on the first driving-related information, that the first road section does not meet an autonomous driving condition requirement of the first vehicle; and
   control, the first vehicle to drive into the parking waiting area.

2. The apparatus according to claim 1, wherein the information about the parking waiting area is comprised in dynamic layer information of a map.

3. The apparatus according to claim 1, wherein the at least one processor is coupled to the at least one memory to execute the instructions to:
   send, to the network side device, second driving-related information of the first vehicle.

4. The apparatus according to claim 1, wherein the at least one processor is coupled to the at least one memory to execute the instructions to: determine that no qualified driver takes over the first vehicle.

5. The apparatus according to claim 1, wherein the at least one processor is coupled to the at least one memory to execute the instructions to:
   receive, from the network side device, third driving-related information of the first road section, wherein the third driving-related information is an update of the first driving-related information;
   determine, based on the third driving-related information, that the first road section meets the autonomous driving condition requirement of the first vehicle; and
   control, the first vehicle to drive through the first road section in an autonomous driving mode.

6. The apparatus according to claim 1, wherein the at least one processor is coupled to the at least one memory to execute the instructions to: output request information to a user of the first vehicle to request the user to indicate any one of the following content: whether the first vehicle can drive out of the first road section through remote driving, whether the first vehicle can drive out of the first road section through guidance based on a route and a time planned by a server, or whether the first vehicle can follow another vehicle to drive out of the first road section.

7. The apparatus according to claim 1, wherein the information about the parking waiting area comprises: a lane number of the parking waiting area, a start location of the parking waiting area, a location of each parking space in the parking waiting area, or an occupation status of the parking space.

8. An autonomous driving apparatus, comprising:
   at least one processor; and
   at least one memory storing program instructions, wherein the at least one processor is coupled to the at least one memory to execute the instructions to:
   receive, from at least one vehicle or a network side device, first driving-related information of a first road section;
   send the first driving-related information and information about a parking waiting area to a first vehicle, wherein the first road section is located ahead of a road on which the first vehicle currently drives, and the parking waiting area is used to park the first vehicle before the first vehicle drives into the first road section.

9. The apparatus according to claim 8, wherein the information about the parking waiting area is comprised in dynamic layer information of a map.

10. The apparatus according to claim 8, wherein the at least one processor is coupled to the at least one memory to execute the instructions to:
    receive, from the first vehicle, second driving-related information of the first vehicle; and
    determine the parking waiting area based on the second driving-related information and the first driving-related information.

11. The apparatus according to claim 8, wherein the at least one processor is coupled to the at least one memory to execute the instructions to:
    send third driving-related information to the first vehicle, wherein the third driving-related information is an update of the first driving-related information.

12. The apparatus according to claim 8, wherein the information about the parking waiting area comprises: a lane number of the parking waiting area, a start location of the parking waiting area, a location of each parking space in the parking waiting area, or an occupation status of the parking space.

13. An autonomous driving method, comprising:
    receiving, from a network side device, first driving-related information of a first road section ahead of a road on which a first vehicle currently drives and information about a parking waiting area to park the first vehicle before the first vehicle drives into the first road section;
    determining, based on the first driving-related information, that the first road section does not meet an autonomous driving condition requirement of the first vehicle; and
    controlling the first vehicle to drive into the parking waiting area.

14. The method according to claim 13, wherein the information about the parking waiting area is comprised in dynamic layer information of a map.

15. The method according to claim 13, wherein before the receiving, from the network side device, first driving-related information of a first road section ahead of a road on which a first vehicle currently drives and information about a parking waiting area, the method further comprising:
    sending, to the network side device, second driving-related information of the first vehicle.

16. The method according to claim 13, wherein before the controlling the first vehicle to drive into the parking waiting area, the method further comprising: determining that no qualified driver takes over the first vehicle.

17. The method according to claim 13, wherein after the controlling the first vehicle to drive into the parking waiting area, the method further comprising:
    receiving, from the network side device, third driving-related information of the first road section, wherein the third driving-related information is an update of the first driving-related information;
    determining, based on the third driving-related information, that the first road section meets the autonomous driving condition requirement of the first vehicle; and
    controlling the first vehicle to drive through the first road section in an autonomous driving mode.

18. The method according to claim 13, wherein after the controlling the first vehicle to drive into the parking waiting area, the method further comprising: outputting request information to a user of the first vehicle to request the user to indicate any one of: whether the first vehicle can drive out of the first road section through remote driving, whether the first vehicle can drive out of the first road section through guidance based on a route and a time planned by a server, or whether the first vehicle can follow another vehicle to drive out of the first road section.

19. The method according to claim 13, wherein the information about the parking waiting area comprises: a lane number of the parking waiting area, a start location of the parking waiting area, a location of each parking space in the parking waiting area, or an occupation status of the parking space.

\* \* \* \* \*